United States Patent
Adams et al.

(10) Patent No.: US 10,176,335 B2
(45) Date of Patent: Jan. 8, 2019

(54) IDENTITY SERVICES FOR ORGANIZATIONS TRANSPARENTLY HOSTED IN THE CLOUD

(75) Inventors: Ross Adams, Redmond, WA (US); Dean Wells, Snohomish, WA (US); Clifford N. Didcock, Sammamish, WA (US); Girish Chander, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/425,143

(22) Filed: Mar. 20, 2012

(65) Prior Publication Data
US 2013/0254847 A1    Sep. 26, 2013

(51) Int. Cl.
G06F 21/62 (2013.01)
H04L 29/06 (2006.01)

(52) U.S. Cl.
CPC ...... *G06F 21/6218* (2013.01); *H04L 63/0815* (2013.01); *G06F 2221/2117* (2013.01); *G06F 2221/2141* (2013.01); *H04L 63/0272* (2013.01)

(58) Field of Classification Search
CPC ... H04L 12/4641; H04L 63/083; H04L 63/08; H04L 63/0815; H04L 63/102; G06F 21/31
USPC .............. 709/217, 219, 250; 726/2, 4–5, 15
See application file for complete search history.

(56) References Cited

U.S. PATENT DOCUMENTS

| | | | |
|---|---|---|---|
| 7,000,006 B1 * | 2/2006 | Chen | ............. H04L 63/20 370/252 |
| 8,370,905 B2 | 2/2013 | Sangubhatla | |
| 8,819,801 B2 | 8/2014 | Sangubhatla et al. | |
| 8,825,855 B2 | 9/2014 | Feng et al. | |
| 8,826,451 B2 | 9/2014 | Blubaugh | |
| 8,850,546 B1 | 9/2014 | Field et al. | |
| 9,450,944 B1 | 9/2016 | Sousley et al. | |
| 2002/0146132 A1 | 10/2002 | Medvinsky | |
| 2003/0120948 A1 | 6/2003 | Schmidt et al. | |
| 2004/0128542 A1 | 7/2004 | Blakely, III et al. | |

(Continued)

FOREIGN PATENT DOCUMENTS

| | | |
|---|---|---|
| CN | 101507233 A | 8/2009 |
| CN | 102281286 A | 12/2011 |

(Continued)

OTHER PUBLICATIONS

No stated author; VMware—Cloud Director Administrator's Guide; 2010; Retrieved from the Internet <URL:vmware.com/pdf/vcd_10_admin_guide.pdf>; pp. 1-104 as printed.*

(Continued)

*Primary Examiner* — Tae K Kim
(74) *Attorney, Agent, or Firm* — Baker & Hostetler LLP (57) ABSTRACT

Embodiments of the invention are disclosed for establishing single identity/single-sign on (SSO) on a cloud computing platform. In an embodiment, a user is validated to the cloud computing platform, and identifies a domain. After establishing that the user has control of the domain, the cloud computing platform configures a directory service for the domain. The user may then use the directory service on the cloud computing platform to log in to his or her computer, as well as software services hosted on the cloud computing platform.

20 Claims, 5 Drawing Sheets

(56) References Cited

U.S. PATENT DOCUMENTS

| | | | |
|---|---|---|---|
| 2005/0278547 | A1 | 12/2005 | Hyndman et al. |
| 2006/0236382 | A1 | 10/2006 | Hinton et al. |
| 2007/0083750 | A1 | 4/2007 | Miura et al. |
| 2007/0118890 | A1* | 5/2007 | Song .................. G06F 17/3089 726/8 |
| 2007/0184819 | A1 | 8/2007 | Barriga-Caceres et al. |
| 2008/0059804 | A1 | 3/2008 | Shah et al. |
| 2009/0178132 | A1* | 7/2009 | Hudis .............. G06F 17/30867 726/12 |
| 2009/0198835 | A1 | 8/2009 | Madhusudanan et al. |
| 2010/0229224 | A1 | 9/2010 | Etchegoyen et al. |
| 2011/0231919 | A1* | 9/2011 | Vangpat et al. .................. 726/8 |
| 2011/0277026 | A1 | 11/2011 | Agarwal et al. |
| 2011/0277027 | A1* | 11/2011 | Hayton .............. H04L 63/0815 726/8 |
| 2011/0307947 | A1 | 12/2011 | Kariv et al. |
| 2012/0011578 | A1 | 1/2012 | Hinton et al. |
| 2012/0096271 | A1* | 4/2012 | Ramarathinam et al. .... 713/172 |
| 2012/0124652 | A1* | 5/2012 | Choi ..................... H04L 63/083 726/5 |
| 2012/0179909 | A1* | 7/2012 | Sagi ..................... H04L 63/045 713/167 |
| 2012/0254957 | A1 | 10/2012 | Fork et al. |
| 2013/0007845 | A1* | 1/2013 | Chang ..................... G06F 21/62 726/4 |
| 2013/0227140 | A1* | 8/2013 | Hinton ..................... H04L 41/00 709/225 |
| 2014/0013409 | A1 | 1/2014 | Halageri |
| 2014/0075565 | A1 | 3/2014 | Srinivasan et al. |
| 2015/0188922 | A1 | 7/2015 | Parmar et al. |
| 2016/0014077 | A1 | 1/2016 | Plotnik et al. |
| 2016/0142408 | A1 | 5/2016 | Raepple |
| 2016/0277497 | A1 | 9/2016 | Bannister et al. |
| 2016/0359854 | A1 | 12/2016 | Bhargava et al. |
| 2017/0111336 | A1 | 4/2017 | Davis et al. |
| 2017/0142094 | A1 | 5/2017 | Doitch et al. |

FOREIGN PATENT DOCUMENTS

| | | | |
|---|---|---|---|
| GB | 2401509 | A | 11/2004 |
| JP | 2005519501 | A | 6/2005 |
| JP | 2006515447 | A | 5/2006 |
| JP | 2008538247 | A | 10/2008 |
| JP | 2011511363 | A | 4/2011 |
| JP | 4892093 | B1 | 3/2012 |
| WO | 2006/103176 | A1 | 10/2006 |
| WO | WO 2006/103176 | A1 | 10/2006 |
| WO | 2009/097073 | A2 | 8/2009 |
| WO | WO 2009/097073 | A2 | 8/2009 |
| WO | 2013071087 | A1 | 5/2013 |

OTHER PUBLICATIONS

VMware, "Cloud Director Administrators Guide", VMware, 2010, pp. 1-104.*

Huang, et al., "Identity Federation Broker for Service Cloud", In Proceedings of the International Conference on Service Sciences, May 13-14, 2010, pp. 115-120.

Liu, et al., "Communications Enablement of Software-as-a-Service (SaaS) Applications", In Proceedings of the 28th IEEE Conference on Global Telecommunications, Nov. 30-Dec. 4, 2009, pp. 1-8.

"Domain 12: Guidance for Identity & Access Management V2.1" Published on: Apr. 2010, Available at: https://cloudsecurityalliance.org/guidance/csaguide-dom12-v2.10.pdf.

"CSC Introduces CloudIAM Identity and Access Management Solution", Published on: Apr. 6, 2011, Available at: http://www.csc.com/newsroom/press_releases/62850-csc_introduces_cloudiam_identity_and_access_management_solution.

HARSHM@TWC, "Give your Business an edge with Microsoft's On-premises and Cloud Services", Published on: Mar. 4, 2011, Available at: http://www.thewindowsclub.com/give-your-business-an-edge-with-microsofts-bunch-of-on-premises-cloud-services.

"How Can I Obtain Identity and Access Management as a Cloud Service?", Retrieved on: Jan. 12, 2012, Available at: http://www.ca.com/~/media/Files/SolutionBriefs/CS1837-cloudMinder-solution-brief.pdf.

European Patent Application No. 13765123.8; Extended Search Report; dated Nov. 11, 2015; 7 pages.

"Office Action Issued in Japanese Patent Application No. 2015-501686", dated Jan. 25, 2017, 6 Pages.

Funabashi, Mikio, "Building a Hybrid Cloud", Published in Fujitsu by Fujitsu Ltd., vol. 62, Issue 1, Jan. 27, 2011, pp. 28-34. (contains English Abstract).

"Test Drive SSO", Retrieved From: http://www.ibm.com/developerworks/ibmi/library/i-sso/i-sso-pdf.pdf, Apr. 22, 2012, 18 Pages.

"Notice of Allowance Issued in European Patent Application No. 13765123.8", dated Jan. 25, 2018, 1 Page.

"Final Office Action Issued in U.S. Appl. No. 14/939,811", dated Nov. 21, 2017, 38 Pages.

"Non Final Office Action Issued in U.S. Appl. No. 14/939,811", dated May 3, 2017, 34 Pages.

"Non Final Office Action Issued in U.S. Appl. No. 14/939,811", dated May 17, 2018, 33 Pages.

Betss, Samuel, "Setup SharePoint Online & On-Premises Single-Sign-on (SSO)", Retrieved From: http://blogs.msdn.com/b/sambetts/archive/2014/09/09/setup-sharepoint-online-amp-on-premises-single-sign-on-sso.aspx, Sep. 9, 2014, 4 Pages.

Chappell, David, "Providing Single Sign-On to Amazon Ec2 Applications from an On-Premises Windows Domain", In WhitePaper of David Chappell & Associates, Dec. 2009, pp. 1-12.

"International Search Report & Written Opinion Issued in PCT Application No. PCT/US20131028121", dated Jun. 3, 2013, 9 Pages.

"International Preliminary Report on Patentability Issued in PCT Application No. PCT/US2016/060746", dated Aug. 7, 2017, 8 Pages.

"International Search Report and Written Opinion Issued in PCT Application No. PCT/US2016/060746", dated Jan. 24, 2017, 13 Pages.

Planky, "Single-Sign-On between On-Premise Apps, Windows Azure Apps and Office 365 Services", Retrieved From: http://blogs.msdn.com/b/plankytronixx/archive/2010/11/27/single-sign-on-between-on-premise-apps-windows-azure-apps-and-office-365-services.aspx, Nov. 27, 2010, 7 Pages.

Planky, "Windows Azure Active Directory: Access Control to Windows Azure", Retrieved From: https://channel9.msdn.com/Series/Windows-Azure-Active-Directory/Windows-Azure-Active-Directory-Control-Access-to-Windows-Azure, Feb. 27, 2013, 1 Page.

Revar, et al., "Securing User Authentication Using Single SignOn in Cloud Computing", In Proceedings of Nirma University Intenational Conference on Engineering, Dec. 8, 2011, pp. 1-4.

* cited by examiner

IDENTITY SERVICES FOR ORGANIZATIONS TRANSPARENTLY HOSTED IN THE CLOUD

BACKGROUND

There are techniques that permit a user to log in once, and gain access to multiple software systems. That is, the user gains access to each of those software systems without needing to log in to each of them. These technologies are sometimes referred to as "single sign-on," (SSO) or "single identity." However, there are many problems with existing SSO/single identity technologies, some of which are well known.

SUMMARY

One problem with implementing SSO/single identity is the amount of technologies that must be configured and installed. To implement SSO/single identity, an administrator must be able to configure and deploy a directory service, a federation service, a synchronization service, a domain name service (DNS), and operating systems.

Another problem exists with SSO/single identity for services provided by cloud computing platforms. Examples of such services include cloud-based document and file management services (such as MICROSOFT OFFICE 365 SHAREPOINT ONLINE), or email services (such as MICROSOFT OFFICE 365 EXCHANGE ONLINE). Even if an administrator implements an on-premises directory (one that is implemented on his or her premises, rather than implemented on a cloud computing platform), that SSO/single identity does not extend to the cloud. Additionally, where SSO is implemented on premise, the system must have great reliability. If the SSO/single identity is not functional, then a user may not log in to either the on premise services, or the cloud services.

The primary embodiment of the invention described herein is for SSO. It may be appreciated that the invention may be used to implement cloud-based single identity in a similar fashion. Embodiments of the invention provide for SSO to services in the cloud in ways that combine both on-premises and cloud SSO, and improve the reliability of SSO. An embodiment of the invention implements SSO in the cloud where there is no on-premises directory. A user is validated to the cloud platform though the use of credentials, such as a logon and password. The user then identifies a public domain for which he wishes to establish SSO, and proves that he has control of the domain. In response to this, the embodiment stands up a domain controller, and federation services. Users of the domain may then both log in to their computer and access cloud services via a SSO.

A second embodiment of the invention implements SSO in the cloud where there is no on-premises directory, and where the user wishes to establish SSO for a private domain. In this embodiment, SSO may be established similar to how SSO is established for a public domain, above. However, the user may not be required to prove that he has control of the private domain.

A third embodiment of the invention implements SSO in the cloud where there is on-premises directory service. In this embodiment, SSO may be established similar to how SSO is established for a public domain, above. Additionally, the user provides a credential to access an on-premises domain controller via a virtual private network (VPN) endpoint that is running on premise. In addition to what is performed above, the embodiment both replicates data in the on-premises domain to the cloud domain service, and stands up a synchronization service that will replicate data between the cloud domain service and the on-premises domain service, as well as synchronize data from the on-premises domain service to services hosted by the cloud computing platform. The embodiment also establishes a VPN connection with the on-premises VPN endpoint, and the synchronization service uses this VPN connection to synchronize data stored in the cloud directory service with data stored in the on-premises directory service.

These embodiments of the invention may extend a private cloud to the customer's on-premises infrastructure via a VPN, or similar, connection. This extension of a private cloud to the customer's on-premises infrastructure allows the customer to extend its functionality without the addition of visible infrastructure—the infrastructure that is added is invisible to the customer, who sees only the added functionality. As such, the on-premises infrastructure may be kept relatively simple, though the functionality is increased. In this sense, the cloud infrastructure may be logically divided into two categories—(1) the cloud-based extension of the on-premises infrastructure that facilitates the SSO/single-identity access to the (2) public cloud services (e.g., email). The cloud-based extension of the on-premises infrastructure may insert a private cloud footprint on the customer's behalf. This private cloud footprint extends the cloud based services of on-premises synchronization services, federation services, and directory services to the on-premises network.

DETAILED DESCRIPTION OF ILLUSTRATIVE EMBODIMENTS

Figure 1:
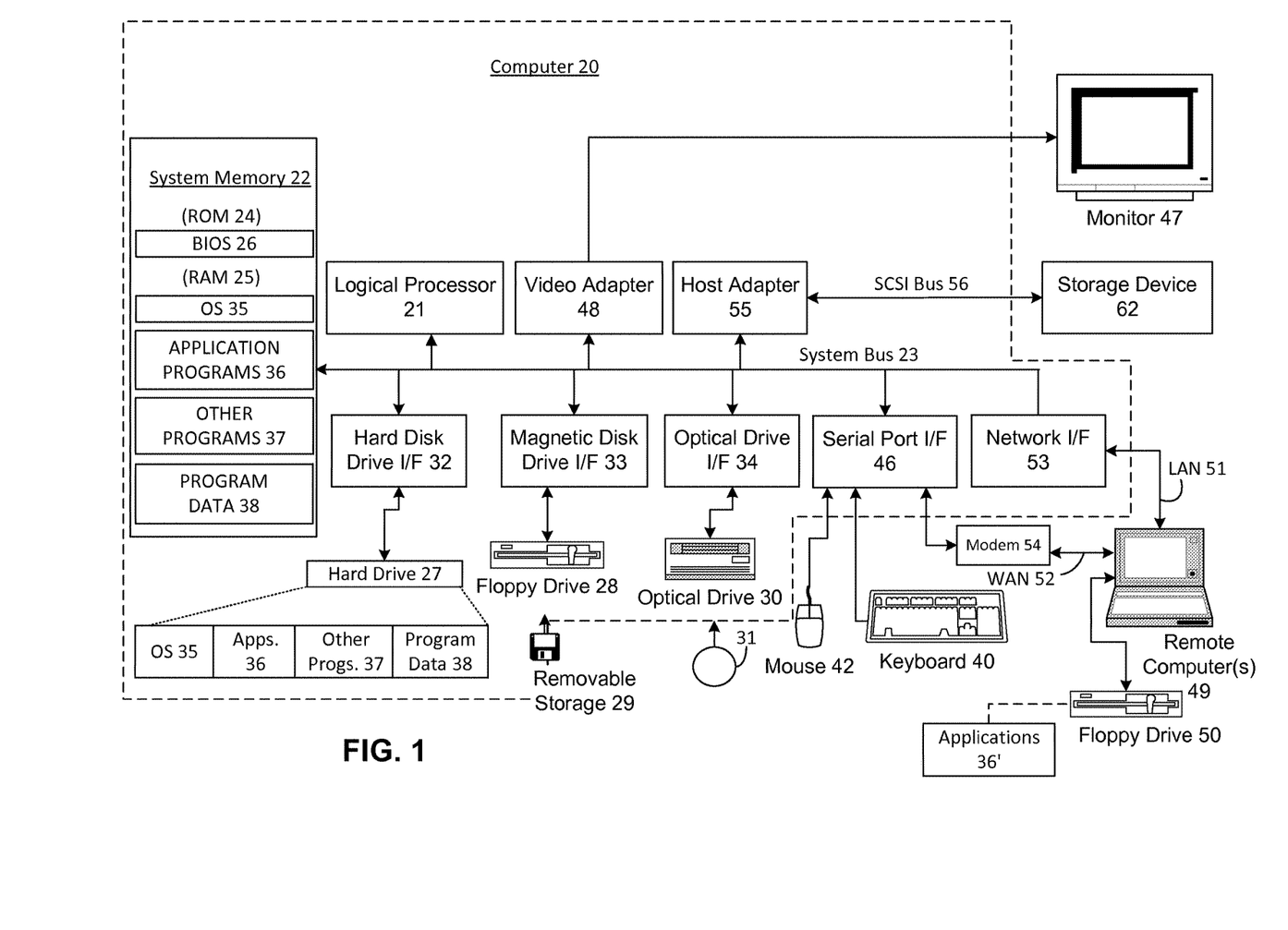
FIG. 1 depicts an example computer in which embodiments of the invention may be implemented.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20.

Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
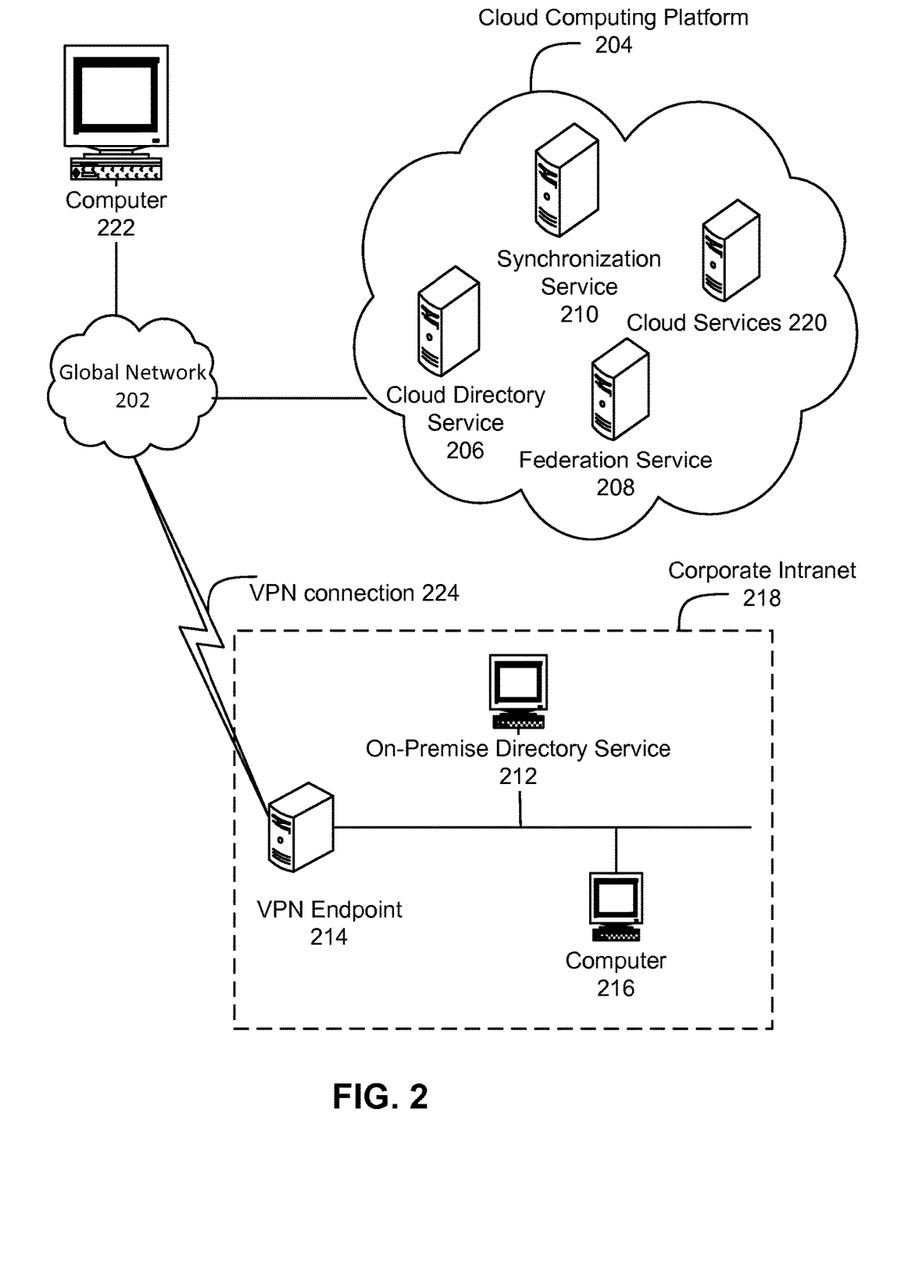
FIG. 2 depicts an example system in which embodiments of establishing SSO on a cloud computing platform may be implemented.

FIG. 2 depicts an example system in which embodiments of establishing SSO on a cloud computing platform may be implemented. Computers depicted in FIG. 2 may be implemented in computer 20 of FIG. 1. A SSO system permits a user to log-in once, and from that one log in, gain access to multiple software systems. In an example SSO environment, a user may be initially prompted for credentials (such as login and password), and in response to providing valid credentials, is issued a ticket-granting ticket (TGT, such as a Kerberos ticket). When additional software systems require logging in, those applications query the TGT to acquire service tickets, which prove the user's identity to those software systems without the user logging in again. In versions of the MICROSOFT WINDOWS operating system environment, WINDOWS login fetches the TGT after the user provides credentials to WINDOWS login. Then, ACTIVE DIRECTORY-aware applications may query the TGT for service tickets.

The general portions of FIG. 2 as depicted are cloud computing platform 204, which is connected via global network 202 to both corporate intranet 218 and computer 222, which is located outside of corporate intranet 218. Computer 222 does not have an on-premises directory service, while corporate intranet 218 does—on-premises directory service 212. Each of computer 222 and corporate intranet 218 may establish a cloud-based SSO.

A cloud computing platform (such as the MICROSOFT WINDOWS AZURE PLATFORM cloud computing platform) generally provides computing resources to one or more users as a service (as opposed to a physical product). Examples of such services are email services, calendar services, contacts services, web page-hosting services, document storage and management services, and spreadsheet, presentation, and document viewing and editing services, such as offered in versions of MICROSOFT OFFICE 365. As depicted herein, one or more of these services may be provided by cloud services 220 of cloud computing platform 204. A cloud-computing platform may be embodied in a datacenter of computers. Such a platform may comprise one or more gateway computers that serve as an external contact point to the platform, load balancer computers, which balance the load among the computers of the platform, and virtual machine (VM) host computers, which host VMs that are executed on the cloud computing platform. When a user accesses a cloud computing platform, he or she may interact with one or more of the VMs, in which the user's services are processed. These VMs may be migrated among the VM hosts to optimize system performance (such as to load balance, or to bring a VM host offline for maintenance). A user may be unaware of the specific implementation of a cloud computing platform, and instead be aware of those services that the cloud computing platform provides on top of this unknown system architecture.

First discussed is establishing a cloud-based SSO for computer 222, which does not have on-premises directory service. A directory service may comprise a database that is used to authenticate users and/or computers within a domain. An example of such a directory service is the MICROSOFT ACTIVE DIRECTORY directory service. As depicted, computer 222 is not associated with corporate intranet 218, and so setting up cloud-based SSO for corporate intranet 218 will not establish SSO for computer 222. A user of computer 222 may connect to cloud computing platform 204 through global network 202 (such as the INTERNET). As depicted, cloud computing platform 204 comprises cloud directory service 206, federation service 208, and synchronization service 210. These services of cloud computing platform 204 are depicted logically, and may be implemented on fewer than (or more than) three computers.

The user of computer 222 may log in to cloud computing platform 204 by providing a credential (such as login and password) that cloud computing platform 204 validates. Once validated, computer 222 may be presented with a user interface for establishing cloud-based SSO. This user interface may be, for instance, part of a web page that computer 222 displays in a web browser.

A user may input data into the user interface indicative of a desire to establish cloud-based SSO, and an identification of a domain to be used in establishing SSO. This information may be sent to cloud computing platform 204. In an embodiment, cloud computing platform 204 determines that the domain identified by computer 222 is a private domain (e.g., contoso.local; a private domain is sometimes referred to as a pseudo domain). In another embodiment, cloud computing platform 204 determines that the domain identified by computer 222 is a public domain (e.g., contoso.com).

Where the domain is a private domain, cloud computing platform 204 may determine that proof of control of the private domain need not be supplied. It may be that proof of control of the domain does not need to be supplied, because, being a private domain, use of it is already limited to an intranet of computer 222.

Where the domain is a public domain, cloud computing platform 204 may establish proof that the user of computer 222 has control of the public domain. This may be accomplished by cloud computing platform generating and sending data to computer 222—for instance, the data may comprise a user identifier (UID) associated with the credential provided by computer 222, the UID having a unique value among UIDs on cloud computing platform 204. This data may be received by computer 222, and then stored in a known, public location on the domain—for instance in a mail exchanger (MX) record, or a domain TXT (text) record on the domain. After the data has been moved to a known location, computer 222 may notify cloud computing platform 204 that this has occurred. In turn, cloud computing platform 204 may retrieve that data that is stored at the known, public location, and verify that that data matches the data that cloud computing platform 204 sent to computer 222. In embodiments where the known, public location is a web server, cloud computing platform 204 may retrieve the data by downloading it via hypertext transfer protocol (HTTP).

In these described embodiments, proving control of a domain may be considered proving the ability to store a file at known, public location on a domain.

Where cloud computing platform 204 has determined that the domain is a private domain, or that the domain is a public domain for which control has been proven, cloud computing platform 204 may then establish cloud-based SSO functionality for the domain. Establishing cloud-based SSO where there is no on-premises directory may comprise standing up a federation service 208 and directory service 206. A federation service may comprise a computer service that facilitates proving identity across software and organizational boundaries (e.g., across multiple software systems executing on a cloud computing platform). A federation service may interact with a directory service such that the directory service authenticates a user initially, and a federation service further authenticates this identity across software or organizational boundaries. A federation service may use claims based authentication whereby a user is authenticated based on a set of claims about the user's identity that are contained within a trusted token (such as one received from a directory service after the user has authenticated to the directory service). An example of a federation service is the MICROSOFT ACTIVE DIRECTORY FEDERATION SERVICE (AD FS) federation service. After cloud-based SSO has been established, computer 222, and other computers on the domain for which computer 222 established SSO, may be logged into, and various software systems offered by cloud-computing platform 204 may be accessed via a single identity/SSO.

In addition to establishing a cloud-based SSO where there is no on-premises directory service, FIG. 2 also depicts computers for which cloud-based SSO may be established where an on-premises directory service does exist. As depicted, corporate intranet 218 has on-premises directory service 212 (as well as VPN endpoint 214 and computer 216). On-premises directory service 212 may serve a function similar to cloud directory service 206: on premise directory service 212 may validate user credentials to access computers and software systems within corporate intranet 218. VPN endpoint 214 may serve as a communications point that is connected to both the intranet of corporate intranet 218 and global network 202. VPN endpoint 214 may serve functionality offered within corporate intranet 218 to computers outside of corporate intranet 218 that are authenticated to VPN endpoint 214. That is, computers authenticated to VPN endpoint 214 may access services and functionality of corporate intranet 218 as if those computers were located within corporate intranet 218.

Computer 216 of corporate intranet may communicate with cloud computing platform 204 to establish cloud-based SSO in conjunction with on-premises directory service 212. Operations of validating credentials, identifying a domain, and standing up directory service 206 and federation service 208 may be performed similar to as described with respect to establishing cloud-based SSO where there is no on-premises directory service. After credentials have been validated, and a domain has been identified (and control thereof proven, in the case of a public domain), establishing cloud-based SSO with on-premises directory may differ from establishing cloud-based SSO without on-premises directory because the former may involve both replicating data between on-premises directory service 212 and cloud directory service 206.

Cloud computing platform 204 may initially replicate data from on-premises directory service 212 to cloud directory service 206. After this initial replication, cloud computing platform 204 may replicate data between on-premises directory service 212 and cloud directory service 206 by standing up synchronization service 210. Synchronization service 210 may perform a function of replicating data between cloud directory service 206 and on-premises directory service 212. In addition to this replicating, synchronization service 210 may also perform a function of synchronizing data between on-premises directory service 212 and cloud services 220. Cloud services 220 may comprise a multi-tenant service platform containing applications (e.g. email) and identity infrastructure—such as a multi-tenant directory and an identity service. In embodiments, the operations of replicating data between cloud directory service 206 and on-premises directory service 212 may occur via VPN connection 224. VPN connection 224 may be used because these operations use a protocol not normally available over the INTERNET (such as MICROSOFT ACTIVE DIRECTORY directory service's replication protocol). In embodiments, the operations of synchronizing data between on-premises directory service 212 and cloud services 220 may occur via a non-VPN connection. A non-VPN connection may be used because the protocols used for these operations are normally available over the INTERNET (such as through a public web services interface).

In addition to standing up synchronization service 210, cloud computing platform 204 may prompt computer 216 to provide a credential that may be used to access both corporate intranet 218 and on-premises directory service 212. This may be a single credential that may be used to access both corporate intranet 218 and on-premises directory service 212on-premises.

Cloud computing platform may establish a VPN connection 224 with VPN endpoint using the supplied credential, and use this connection as well as the credential(s) to access on-premises directory service 206. Note that in embodiments, some communications between corporate intranet 218 and cloud computing platform 204 may occur on a network connection that is not a VPN connection. Then, synchronization service 210 may replicate data between cloud directory service 206 and on-premises directory service 212. Thus, the SSO functionality provided by on-premises directory service 206 within corporate intranet 218 is extended to cloud directory service 206 and software systems provided by cloud computing platform 204.

Figure 3:
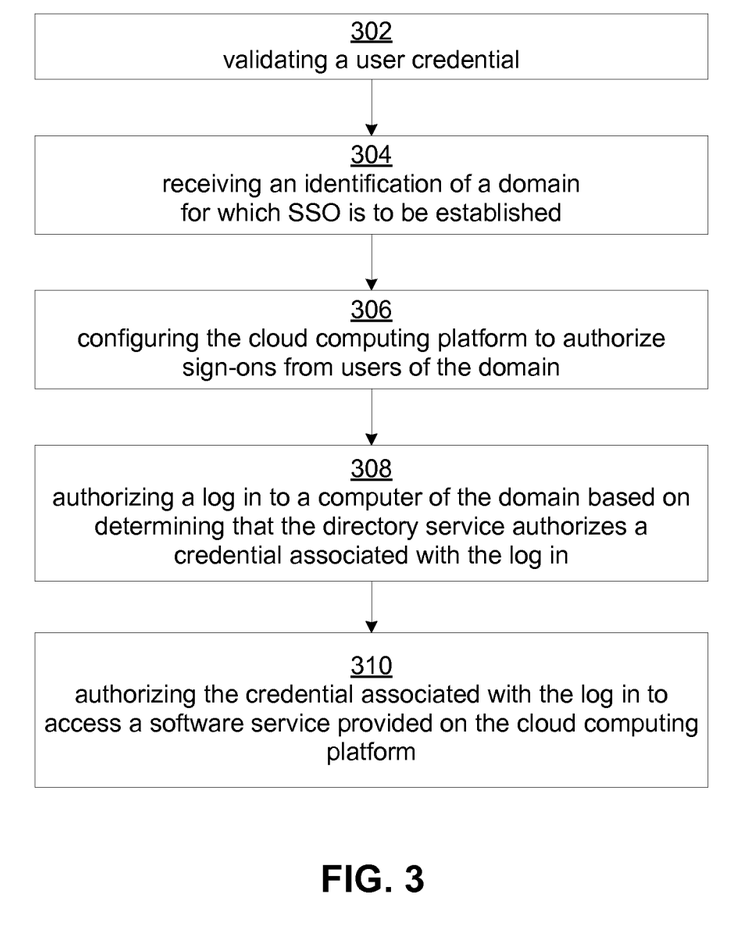
FIG. 3 depicts example operating procedures for establishing SSO on a cloud computing platform.

FIG. 3 depicts example operating procedures for establishing SSO on a cloud computing platform. It may be appreciated that there are embodiments of the invention that do not implement all of the operations depicted in FIG. 3 (or FIGS. 4-6), and embodiments of the invention that implement the operations depicted in FIG. 3 (or FIGS. 4-6) in a different order than as depicted herein. The operations of FIG. 3 may be implemented, for instance, on cloud computing platform 204 of FIG. 2.

Operation 302 depicts validating a user credential. In an embodiment, this user credential may be a credential received from a computer (such as computer 222 or computer 216), and thus, may comprise validating a user credential associated with a computer.

Operation 304 depicts receiving an identification of a domain for which SSO is to be established. This indication may be received from the computer that proffered the user credential identified in operation 302. For example, cloud computing platform 204 may provide a user interface to computer 216 or computer 222 via a web page, and data may be input into that web page that identifies a domain for which SSO is to be established.

Operation 306 depicts configuring the cloud computing platform to authorize sign-ons from users of the domain. Operation 306 may be performed where the user credential has been validated in operation 302. Operation 306 may comprise configuring a directory service and a federation service on the cloud computing platform for users of the domain.

Operation 308 depicts authorizing a log in to a computer of the domain based on determining that the directory service authorizes a credential associated with the log in. In embodiments, operation 308 comprises determining to permit a log in to a second computer in response to determining that the directory service authorizes a credential associated with the log in.

Operation 310 depicts authorizing the credential associated with the log in to access a software service provided on the cloud computing platform. Operation 310 may be performed in response to determining that the directory service authorized the credential associated with the log in.

Figure 4:
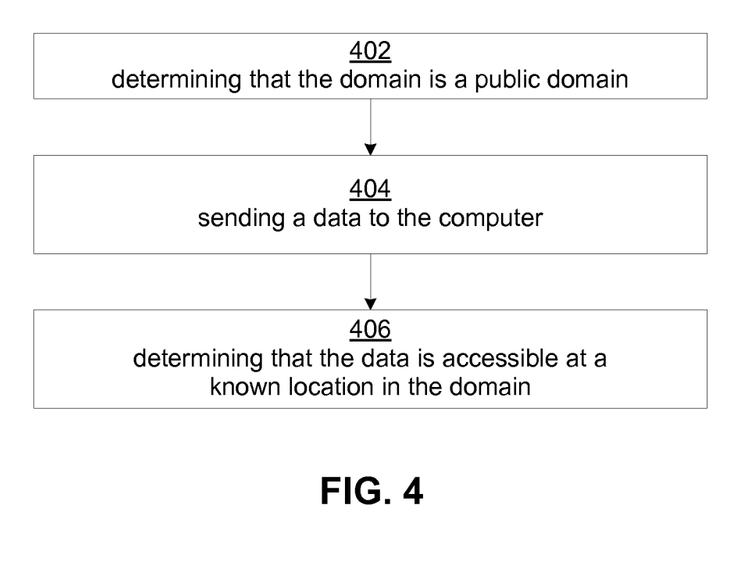
FIG. 4 depicts additional example operating procedures for establishing SSO on a cloud computing platform with a public domain.

FIG. 4 depicts additional example operating procedures for establishing SSO on a cloud computing platform with a public domain. In embodiments where the operational procedures of FIG. 4 are performed in conjunction with the operational procedures of FIG. 3, the operational procedures of FIG. 4 (which may be used to determine that the requestor has control of the domain in question) may be implemented before operation 306 (where the cloud computing platform may be configured to authorize sign-ons from the domain).

Operation 402 depicts determining that the domain is a public domain. This may comprise parsing the providing domain (e.g., contoso.com) to determine that the domain contains a top-level domain (e.g., .COM or .NET) that is publicly available (as opposed to, for example, a private top-level domain, like .LOCAL).

Operation 404 depicts sending a data to the computer. Operation 404 may be performed in response to determining that the domain is a public domain. Where, instead, it is determined that the domain is a private domain, the operational procedures of FIG. 5 may be implemented. The data may comprise information that may be stored in the domain in a known, publicly-accessible (or, otherwise accessible, with the use of credentials provided to cloud computing platform 204) location. For instance, where cloud computing platform 204 maintains a user identifier (UID) for each user of cloud computing platform 204, and the value stored in these UIDs is unique among UIDs, cloud computing platform 204 may send this UID to the computer as the data. In response to receiving the data, the computer may then store the data at a known, publicly-accessible location within the domain.

Operation 406 depicts determining that the data is accessible at a known location in the domain. In embodiments, operation 406 comprises determining that the data is stored within a mail exchanger (MX) record in the domain, or determining that the data is stored within a domain TXT record (text record) in the domain. Where the data is stored on a web server, operation 406 may comprise cloud computing platform 204 making a hypertext transfer protocol (HTTP) request to retrieve what data is stored at the known location. Then, cloud computing platform 204 may compare this retrieved data with the data it provided the computer in operation 404 and determine whether the values match (indicating that the requestor has access to or control of the domain) or the values differ (indicating that the requestor has not shown sufficient access to or control of the domain to merit establishing cloud-based SSO for that domain).

Figure 5:
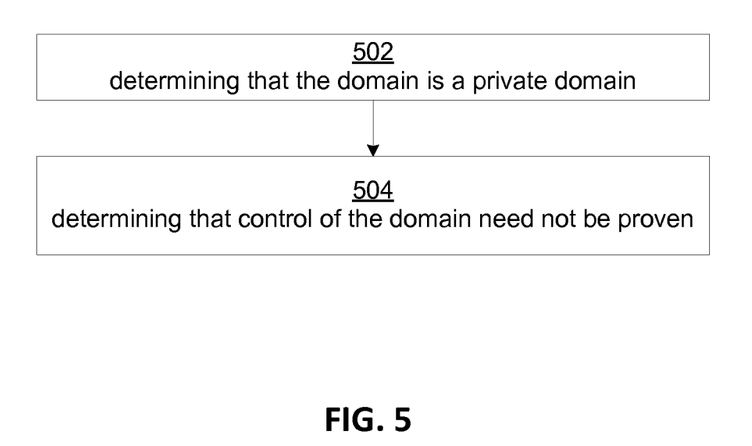
FIG. 5 depicts additional example operating procedures for establishing SSO on a cloud computing platform with a private domain.

FIG. 5 depicts additional example operating procedures for establishing SSO on a cloud computing platform with a private domain. In embodiments where the operational procedures of FIG. 5 are performed in conjunction with the operational procedures of FIG. 3, the operational procedures of FIG. 5 (which may be used to determine that the requestor has control of the domain in question) may be implemented before operation 306 (where the cloud computing platform may be configured to authorize sign-ons from the domain).

Operation 502 depicts determining that the domain is a private domain. This may comprise parsing the provided domain (e.g., contoso.com) to determine that the domain contains a private top-level domain (e.g., .LOCAL) that is not publicly available (as opposed to, for example, a publicly-available top-level domain, like .COM or .NET).

Operation 504 depicts determining that control of the domain need not be proven. Where the domain is a private domain, control of the domain may be inferred by virtue of the domain being private—e.g., since the private domain is local to the intranet on which it exists, control of it may be inferred. Thus, where the domain is a private domain, cloud computing platform 204 may determine that no additional proof of control of the domain is necessary (such as via the operational procedures of FIG. 4), and cloud computing platform may then begin configuring the cloud computing platform to authorize sign-ons from users of the private domain.

Figure 6:
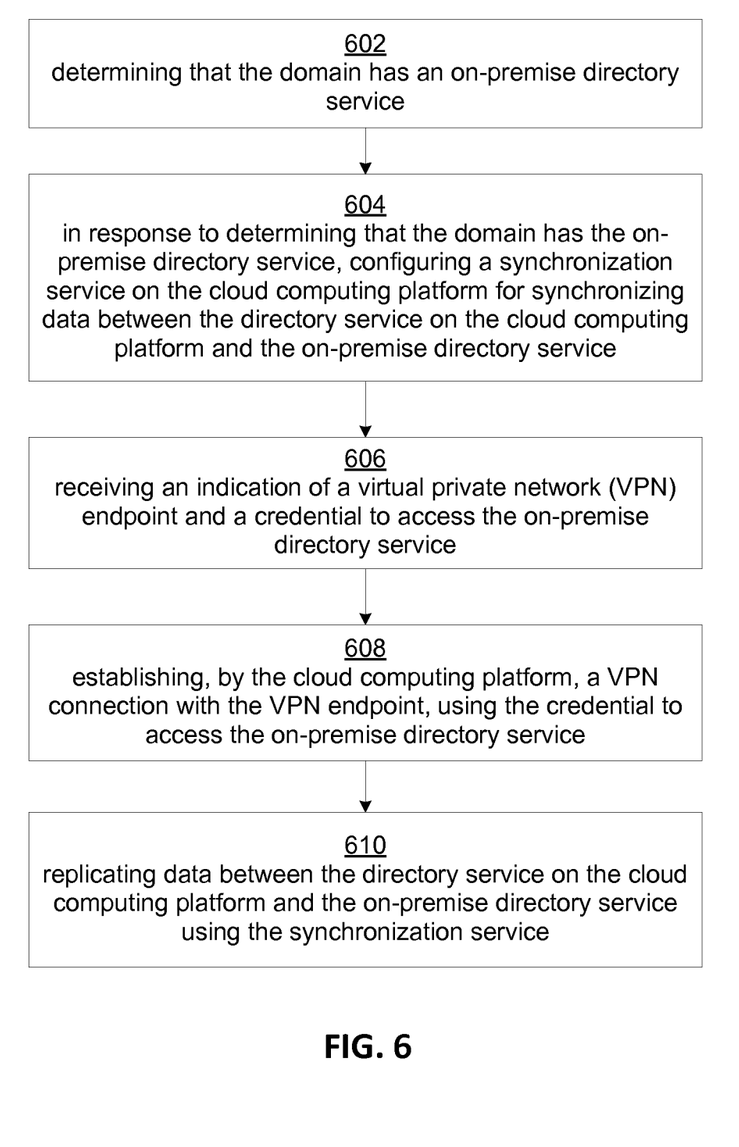
FIG. 6 depicts additional example operating procedures for establishing SSO on a cloud computing platform where there is on-premises directory.

FIG. 6 depicts additional example operating procedures for establishing SSO on a cloud computing platform where there is on-premises directory. In embodiments, the operational procedures of FIG. 6 may be used to establish SSO on cloud computing platform 204 for corporate intranet 218, which has on-premises directory 212.

Operation 602 depicts determining that the domain has an on-premises directory service. In embodiments, operation 602 may comprise prompting the entity that has requested establishing cloud-based SSO for an indication of whether or not the entity has on-premises directory service. For instance, where cloud computing platform 204 provides a user interface in a web page to computer 216, this user interface may also contain user interface elements that are configured to allow for the indication of whether there is on-premises directory.

Operation 604 depicts, configuring a synchronization service on the cloud computing platform. This synchronization service may be used both for replicating data between the on-premises directory service and the cloud computing platform, and for synchronizing data between the on-premises directory service and the cloud services on the cloud computing platform. Operation 604 may be performed in response to determining that the domain has the on-premises directory service. Where the domain does not have on-premises directory service, cloud computing platform 204 may determine not to configure a synchronization service in conjunction with establishing cloud-based SSO.

Operation 606 depicts receiving an indication of a virtual private network (VPN) endpoint and a credential to access the on-premises directory service. Using the example system of FIG. 2, this VPN endpoint may be VPN endpoint 218. Where cloud computing platform 204 provides a user interface in a web page to computer 216, as in operation 602, this user interface may also comprise user interface elements that are configured for inputting credentials for the VPN endpoint and on-premises directory service.

Operation 608 depicts establishing, by the cloud computing platform, a VPN connection with the VPN endpoint, using the credential to access the on-premises directory service. Once the VPN connection is established, synchronization service 210 may both replicate data between the on-premises directory service 212 and cloud directory service 206, and synchronize data between on-premises directory service 212 and cloud services 220, as depicted in operation 610.

This establishment of a VPN connection from cloud computing platform 204 to corporate intranet 218 may be considered to be establishing a VPN connection in the opposite direction of a more typical VPN connection. In a more typical scenario, computer 222 may initiate a VPN connection with corporate intranet 218 to extend the functionality provided by corporate intranet 218 to computer 222. In contrast, here, cloud computing platform 204 is initiating a VPN connection with corporate intranet 218 to extend the functionality provided by cloud computing platform 204 to corporate intranet 218. That is, instead of computer 222 establishing a VPN connection to increase the functionality that it receives from corporate intranet 218, cloud computing platform 204 is establishing a VPN connection to increase the functionality that is provided to corporate intranet 218 (this functionality including cloud-based SSO that extends to software systems provided by cloud computing platform 204, for which credentials are required).

Operation 610 depicts replicating data between the directory service on the cloud computing platform and the on-premises directory service using the synchronization service. As data is modified on either cloud directory service 206 or on-premises directory service 212 (e.g., a new user account is created on one of these directory services), synchronization service 210 may monitor these directory services for modifications, and where synchronization service 210 detects such a modification, it may modify the other directory service accordingly, so that directory service 206 and on-premises directory service 212 contain the same SSO information.

While the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for establishing single identity on a cloud computing platform, comprising:
   validating a user credential associated with a first user on a first computer;
   receiving, from the first computer, information indicative of a domain comprising a plurality of computing devices communicating over a network for which single identity is to be established;
   determining that the first user has control of the domain, in response to a determination that the domain is a public domain;
   in response to validating the user credential and determining that the first user has control of the domain, storing the information indicative of the domain in a service on the cloud computing platform for authorizing sign-ons from a plurality of users of the domain including the first user, the service comprising a database used to authenticate the plurality of users within the domain;
   determining to permit a log in by the first user to a second computer hosted on the cloud platform in response to determining that the service authorizes the user credential associated with the log in; and
   authorizing the first user to access a software service provided on at least one computing device within the domain hosted on the cloud computing platform in response to determining that the service authorized the user credential associated with the log in.

2. The method of claim 1, further comprising:
   determining that the domain has a service located external to the cloud computing platform;
   in response to determining that the domain has the service located external to the cloud computing platform, configuring a synchronization service on the cloud computing platform for replicating data between the service on the cloud computing platform and the service located external to the cloud computing platform;
   receiving an indication of a virtual private network (VPN) endpoint and a credential to access the service located external to the cloud computing platform;
   establishing, by the cloud computing platform, a VPN connection with the VPN endpoint, using the user credential to access the service located external to the cloud computing platform; and
   replicating credential data between the service on the cloud computing platform and the service located external to the cloud computing platform using the synchronization service.

3. The method of claim 1, wherein configuring the service on the cloud computing platform for sign-ons from users of the domain further comprises:
   in response to receiving the information indicative of a domain, configuring a federation service on the cloud computing platform to authenticate a user of the domain across an organizational boundary after the first user has been authenticated by the service.

4. The method of claim 1, wherein storing the information indicative of the domain in the service on the cloud computing platform for authorizing sign-ons from users of the domain comprises:
   in response to determining that the domain is a public domain, sending data to the computer; and
   determining that the data is accessible at a known location in the domain.

5. The method of claim 4, wherein determining that the data is accessible at the known location in the domain comprises:
   determining that the data is stored within a mail exchanger (MX) record in the domain.

6. The method of claim 4, wherein determining that the data is accessible at the known location in the domain comprises:
   determining that the data is stored within a domain TXT record (text record) in the domain.

7. The method of claim 1, wherein storing the information indicative of the domain in the service on the cloud computing platform for authorizing sign-ons from users of the domain comprises:
   determining that control of the domain need not be proven in response to determining that the domain is a private domain.

8. The method of claim 1, wherein determining that the first user has control of the domain comprises:
   generating a unique identifier (UID) associated with the validated user credential; and
   sending the UID to the computer to be stored a known, public location on the domain.

9. A system for establishing single identity on a cloud computing platform, comprising:
   a module configured to validate a user credential associated with a first user on a first computer;
   a module configured to receive, from the first computer, information indicative of a domain for which single identity is to be established, the domain comprising a plurality of computing devices communicating over a network;
   a module configured to determine that the domain is a public domain;
   a module configured to, in response to determining that the domain is a public domain, determine that the first user has control of the domain;
   a module configured to, in response to validating the user credential and determining that the first user has control of the domain, store the information indicative of the domain in a service on the cloud computing platform for authorizing sign-ons from a plurality of users of the domain including the first user, the service comprising a database used to authenticate the plurality of users within the domain;

a module configured to, determine to permit a log in by the first user to a second computer on the cloud computing platform in response to determining that the service authorizes the user credential associated with the log in; and
a module configured to authorize the first user to access a software service provided on at least one computing device within the domain hosted on the cloud computing platform in response to determining that the directory service authorized the user credential associated with the log in.

10. The system of claim 9, further comprising:
a module configured to determine that the domain has a service located external to the cloud computing platform;
a module configured to, in response to determining that the domain has the service located external to the cloud computing platform, configure a synchronization service on the cloud computing platform for replicating data between the service on the cloud computing platform and the service located external to the cloud computing platform;
a module configured to receive an indication of a virtual private network (VPN) endpoint and a credential to access the service located external to the cloud computing platform;
a module configured to establish, by the cloud computing platform, a VPN connection with the VPN endpoint, using the credential to access the service located external to the cloud computing platform; and
a module configured to replicate credential data between the service on the cloud computing platform and the service located external to the cloud computing platform using the synchronization service.

11. The system of claim 9, further comprising:
a module configured to, in response to receiving the information indicative of a domain, configure a federation service on the cloud computing platform to authenticate a user of the domain across an organizational boundary after the first user has been authenticated by the service.

12. The system of claim 9, comprising:
a module configured to, in response to determining that the domain is a public domain, send data to the computer; and
a module configured to determine that the data is accessible at a known location in the domain.

13. The system of claim 12, wherein the module configured to determine that the data is accessible at the known location in the domain further configured to:
determine that the data is stored within a mail exchanger (MX) record in the domain.

14. The system of claim 12, wherein the module configured to determine that the data is accessible at the known location in the domain further configured to:
determine that the data is stored within a domain TXT record (text record) in the domain.

15. The system of claim 9, further comprising:
a module configured to determine that control of the domain need not be proven in response to determining that the domain is a private domain.

16. A computer-readable storage device for establishing single identity on a cloud computing platform, bearing computer-executable instructions that when executed on a computer, cause the computer to perform operations comprising:

validating a user credential associated with a first user on a first computer;
receiving, from the first computer, information indicative of a domain comprising a plurality of computing devices communicating over a network for which single identity is to be established;
determining that the first user has control of the domain in response to a determination that the domain is a public domain
in response to validating the user credential and determining that the first user has control of the domain, storing the information indicative of the domain in a service on the cloud computing platform for authorizing sign-ons from a plurality of users of the domain including the first user, the service comprising a database used to authenticate the plurality of users within the domain;
determining to permit a log in by the first user to a second computer on the cloud platform in response to determining that the service authorizes the user credential associated with the log in; and
authorizing the first user to access a software service provided on at least one computing device within the domain hosted on the cloud computing platform in response to determining that the service authorized the user credential associated with the log in.

17. The computer-readable storage device of claim 16, further bearing computer-executable instructions that when executed on the computer, cause the computer to perform operations comprising:
determining that the domain has a service located external to the cloud computing platform;
in response to determining that the domain has the service located external to the cloud computing platform, configuring a synchronization service on the cloud computing platform for replicating data between the service on the cloud computing platform and the service located external to the cloud computing platform;
receiving an indication of a virtual private network (VPN) endpoint and a credential to access the service located external to the cloud computing platform;
establishing, by the cloud computing platform, a VPN connection with the VPN endpoint, using the credential to access the service located external to the cloud computing platform; and
replicating credential data between the service on the cloud computing platform and the service located external to the cloud computing platform using the synchronization service.

18. The computer-readable storage device of claim 16, wherein storing the information indicative of the domain in a service on the cloud computing platform for authorizing sign-ons from users of the domain further comprises:
in response to receiving the information indicative of a domain, configuring a federation service on the cloud computing platform to authenticate a user of the domain across an organizational boundary after the first user has been authenticated by the service.

19. The computer-readable storage device of claim 16, wherein storing the information indicative of the domain in a service on the cloud computing platform for authorizing sign-ons from users of the domain comprises:
in response to determining that the domain is a public domain, sending data to the computer; and
determining that the data is accessible at a known location in the domain.

20. The computer-readable storage device of claim 17, wherein determining that the domain has a service located external to the cloud computing platform comprises:
   prompting the first computer for an indication that the domain has the external service;
   receiving the indication from the first computer.

\* \* \* \* \*